(12) United States Patent
Chang et al.

(10) Patent No.: US 8,686,593 B2
(45) Date of Patent: Apr. 1, 2014

(54) SYSTEMS AND METHODS OF POWER DEVICE LIGHTING

(75) Inventors: Yi-Ching Chang, Sindian (TW); Shen-Yuan Chien, Taipei (TW)

(73) Assignee: Schneider Electric IT Corporation, West Kingston, RI (US)

( * ) Notice: Subject to any disclaimer, the term of this patent is extended or adjusted under 35 U.S.C. 154(b) by 674 days.

(21) Appl. No.: 12/890,920

(22) Filed: Sep. 27, 2010

(65) Prior Publication Data

US 2012/0074840 A1    Mar. 29, 2012

(51) Int. Cl.
*H02J 7/00* (2006.01)
*H02J 9/00* (2006.01)

(52) U.S. Cl.
USPC ........................................................ 307/64

(58) Field of Classification Search
USPC ........................................................ 307/64
See application file for complete search history.

(56) References Cited

U.S. PATENT DOCUMENTS

| | | |
|---|---|---|
| 5,587,881 A | 12/1996 | Wang |
| 5,793,627 A | 8/1998 | Caldes et al. |
| 6,273,578 B1 | 8/2001 | Lai |
| 6,486,407 B1 | 11/2002 | Hawker et al. |
| 6,560,106 B2 | 5/2003 | Ivey et al. |
| 6,857,760 B2 | 2/2005 | Chien |
| 6,940,015 B2 | 9/2005 | Fang |
| 7,011,422 B2 | 3/2006 | Robertson et al. |
| 7,133,293 B2 | 11/2006 | Fiorentino et al. |
| 7,726,825 B2 | 6/2010 | Mandapat et al. |
| 7,790,982 B2 | 9/2010 | Weeks et al. |
| 2001/0046130 A1 | 11/2001 | Cunningham et al. |
| 2002/0105230 A1 | 8/2002 | Ziegler et al. |
| 2002/0189848 A1 | 12/2002 | Hawker et al. |
| 2003/0080654 A1 | 5/2003 | Chen et al. |
| 2006/0002055 A1 | 1/2006 | Germagian et al. |
| 2006/0044800 A1* | 3/2006 | Reime ............................. 362/276 |
| 2006/0087829 A1 | 4/2006 | Manico et al. |
| 2007/0114851 A1* | 5/2007 | Lin et al. .......................... 307/66 |
| 2008/0007533 A1 | 1/2008 | Hotelling |
| 2008/0157601 A1 | 7/2008 | Masciarelli et al. |
| 2008/0233780 A1 | 9/2008 | Waters et al. |
| 2009/0035967 A1 | 2/2009 | Weeks et al. |
| 2009/0150818 A1 | 6/2009 | Bakhreiba et al. |
| 2009/0213567 A1 | 8/2009 | Mandapat et al. |
| 2009/0231167 A1 | 9/2009 | Chen |
| 2009/0322709 A1 | 12/2009 | Lee et al. |

FOREIGN PATENT DOCUMENTS

WO      01/93403 A2    12/2001

OTHER PUBLICATIONS

International Search Report for PCT/US2010/033138 mailed Aug. 12, 2010.
International Search Report for PCT/US2011/053207 mailed Dec. 28, 2011.

* cited by examiner

*Primary Examiner* — Carlos Amaya
(74) *Attorney, Agent, or Firm* — Lando & Anastasi, LLP

(57) ABSTRACT

Aspects and embodiments described herein provide power devices with tactile sensors to activate light emitting elements that illuminate power device interfaces, facilitating engagement of the interfaces with external loads and their connectors and the manipulation of control panels and their interfaces. A housing houses at least a portion of the power device and can include a tactile sensor to detect a presence of an object proximate to the power device. When an object is detected, the controller and the tactile sensor activate at least one light emitting element to illuminate a least a portion of the housing that includes an interface.

19 Claims, 4 Drawing Sheets

SYSTEMS AND METHODS OF POWER DEVICE LIGHTING

BACKGROUND OF THE INVENTION

1. Field of Invention

At least one embodiment of the present invention relates generally to power devices, such as uninterruptible power supplies, power distribution units, and power strips, and more specifically, to selective lighting of power device external surfaces.

2. Discussion of Related Art

Power devices are used to provide reliable power to many different types of electronic equipment in residential, commercial, business, and industrial settings. Power devices are generally handled with care, and are often placed in low traffic areas. Power devices can include various inputs and outputs to connect to both power sources and to equipment being powered. Human operators, such as users of the equipment being powered or service technicians, access power devices for installation, maintenance, power conservation or other reasons.

SUMMARY OF THE INVENTION

Aspects and embodiments are directed to illuminating an external surface of a power device when a person or other object approaches or is touching the power device. A sensor detects the presence of the person and together with a controller activates at least one light emitting element, which illuminates at least a portion of the outer surface of the power device.

At least one aspect is directed to an uninterruptible power supply that includes an input configured to receive input power, a backup power source configured to provide backup power, and a housing. The housing includes an interface, a light emitting element, and a tactile sensor. The tactile sensor can detect a presence of an object proximate to the uninterruptible power supply. A controller can provide output power derived from at least one of the input power and the backup power at an output, and can activate the light emitting element to illuminate the interface.

At least one aspect is directed to a method of illuminating a housing of an uninterruptible power supply. The uninterruptible power supply can have an input to receive input power, a backup power source to provide backup power, a controller, and the housing. The housing can include an interface, a light emitting element, and a tactile sensor. The method can include at least one act of providing output power derived from at least one of the input power and the backup power at the interface, sensing a presence of an object proximate to the housing, and activating, responsive to the presence of the object, the light emitting element to illuminate the interface of the housing.

At least one aspect is directed to an uninterruptible power supply that includes an input to receive input power, a backup power source to provide backup power, and a housing that includes an interface and a light emitting element. Control circuitry can provide output power derived from at least one of the input power and the backup power at an output. The uninterruptible power supply can include means for detecting a presence of an object proximate to the uninterruptible power supply, and for activating the light emitting element to illuminate the interface of the housing responsive to the presence of the object.

In various embodiments, the tactile sensor can detect a capacitance value, and the controller can activate the light emitting element based on the capacitance value. The tactile sensor can also detect a resistance value, and the controller can activate the light emitting element based on the resistance value. The tactile sensor can detect the presence of the object based on contact by the object with the uninterruptible power supply.

In some embodiments, the uninterruptible power supply includes an array of tactile sensors and a plurality of light emitting elements. A first tactile sensor of the array and the controller can activate a first light emitting element. A second tactile sensor of the array and the controller can activate a second light emitting element. The light emitting element can illuminate at least one of a power strip, a socket, a universal serial bus, a plug interface, an outlet, a connector, a jack, a display, a control panel, a user interface, and at least one of a plurality of interfaces.

In various embodiment, a conductive surface of the uninterruptible power supply includes the tactile sensor. The tactile sensor can include at least one of a touch sensor, a capacitance touch sensor, a resistance touch sensor, and a proximity sensor. In some embodiments, the tactile sensor includes a proximity sensor to detect the presence of the object within six inches of the uninterruptible power supply. The output can includes an output interface configured to connect with at least one load.

In some embodiments, a capacitance value of the housing of the uninterruptible power supply can be determined. The light emitting element can be activated based on an evaluation of the capacitance value and a threshold capacitance value. In one embodiment, a first capacitance value of the housing of the uninterruptible power supply can be determined at a first time, and a second capacitance value of the housing can be determined at a second time. The light emitting element can be activated when a difference between the first capacitance value and the second capacitance value is greater than a threshold amount.

In one embodiment, a change in capacitance of the housing of the uninterruptible power supply can be detected, and the light emitting element can be activated based on a magnitude of the change. The presence of the object can be sensed based on a capacitance value of the housing of the uninterruptible power supply and a threshold capacitance value. In one embodiment, a resistance value of the housing of the uninterruptible power supply can be determined, and the light emitting element can be activated based on an evaluation of the resistance value and a threshold resistance value. In one embodiment, means for detecting the presence of the object include means for detecting at least one of a capacitance value of the housing, a resistance value of the housing, and a proximity distance between the object and the uninterruptible power supply.

These and other aspects and embodiments are discussed in detail below. The foregoing information and the following detailed description include illustrative examples of various aspects and embodiments, and are intended to provide an overview or framework for understanding the nature and character of the claimed aspects and embodiments. The drawings provide illustration and a further understanding of the various aspects and embodiments, and are incorporated in and constitute a part of this specification. The drawings, together with the remainder of the specification, serve to describe and explain the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
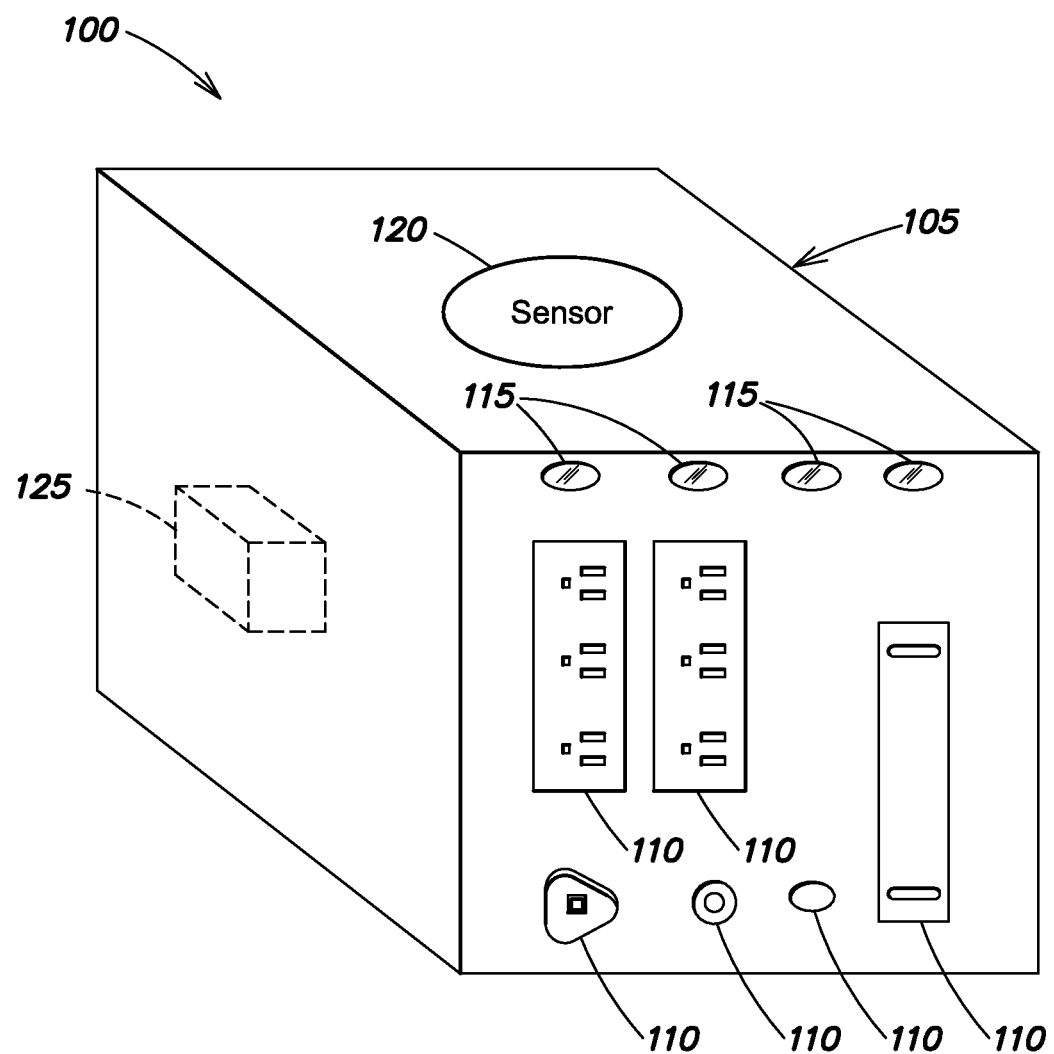
FIG. 1A is a schematic diagram depicting a power device in accordance with an embodiment.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter, equivalents thereof, and additional items, as well as alternate embodiments consisting of the items listed thereafter exclusively.

Various aspects and embodiments are directed to external illumination of power devices. Power devices can be shielded from natural or artificial light when positioned in obscure locations, for example under a desk, in a confined space, close to other power devices or electronic equipment, or in other generally darker or shaded areas. The lack of light can hinder engagement of plugs, wires, cables, and the like with the power devices' inputs and outputs. Aspects and embodiments described herein provide power devices with tactile sensors to activate light emitting elements that illuminate power device interfaces, control panels, or their components, facilitating engagement of these interfaces with external loads and their connectors.

FIG. 1A is a schematic diagram of power device 100 in accordance with an embodiment. In one embodiment, power device 100 is an electronic device that receives input power from a power source and provides output power to a load. The power source can be, for example, AC main lines from a power grid, or an AC or DC backup power source. Power device 100 can provide power through multiple outlets. Examples of power device 100 include power distribution units, power strips, surge protectors, power strips, power conditioners, or uninterruptible power supplies, as well as combinations thereof. In one embodiment, power device 100, may include the features of one or more power devices described in commonly owned U.S. patent application Ser. No. 12/434,156, entitled "Power Device with Lighted Outlets," filed on May 1, 2009, which is incorporated herein by reference in its entirety. The referenced application generally discloses power devices having illuminated outlet openings.

In one embodiment, power device 100 includes housing 105. Housing 105 includes one or more panels fixed about at least one side of power device 100. Housing 105 generally protects the components of power device 100, and can be made from conductive materials such as metal. Housing 105 can also include non-conductive plastics or other non-conductive materials. Housing 105 can encase any of the front, back, top, bottom or sides of power device 100. In one embodiment, housing 105 includes apertures or other openings for air flow in and out of power device 100. Housing 105 can be a continuous panel or a plurality of panels permanently or temporarily fixed to each other or to power device 100. All or part of housing 105 can be removed from power device 100, for example to allow access to power device 100.

The power device 100 includes a plurality of interfaces 110. Each of the interfaces 110 engages with external components to provide or receive power or information from external devices or power sources. For example, interface 110 may include input interfaces to receive power from a power source, such as a socket configured to receive a plug from a wall outlet to receive AC input power. Interface 110 may also include output interfaces to provide power to a load, such as a socket configured to receive a plug to provide power to a computer, lamp, or other load. Input and output interfaces may be located in the same area of power device 100, such as on the same panel of housing 105 as illustrated in FIG. 1A, or on different panels or combinations thereof.

Housing 105 is configured with cut outs or other openings to accommodate interfaces 110. Interfaces 110 may include sockets configured to receive plugs of different physical shapes, such as plug and socket shapes that accommodate standards set forth by the National Electrical Manufacturers Association, International Electrotechnical Commission, or other North American, South American, European, Asian, African, or Australian standards. Interfaces 110 can include at least one power strip, socket, universal serial bus, plug interface, outlet, connector, jack, display, card slot, connector, button or user interface for power input or power output modules. Interface 110 can be part of a control panel, such as a button, liquid crystal or plasma display, or component thereof. Interfaces can be generally flush with, inset into, or protruding outward from the outer surface of power device 100.

The power device 100 includes a plurality of light emitting elements 115. Light emitting elements 115 can include light emitting diodes (including for example red, green, blue, organic, phosphor, or white light emitting diodes), or light bulbs (including filament based, halogen, or incandescent) that radiate light. Light emitting elements 115 are positioned on power device 100 so that at least one light emitting element 115 illuminates at least one interface 110 when light emitting element 115 is activated (i.e., turned on and emitting light).

Light emitting elements 115 can be positioned proximate to interfaces 110. In one embodiment, at least one light emitting element 115 forms a strip along at least part of an edge or lip of power device 110, such as the top front edge as depicted in FIG. 1A, facing downward toward interfaces 110 to directly illuminate them. In one embodiment, light emitting elements 115 are embedded in power device 100, generally flush with the surface of power device 100 and not directly facing interfaces 110, so that when activated they propagate light outward from power device 100, indirectly illuminating interfaces 110. Each interface 110 can have a dedicated light emitting element 115, or one light emitting element 115 can be positioned to directly or indirectly illuminate more than one interface 110. In one embodiment, at least one light emitting element 115 is positioned proximate to at least one interface 110 so that, when activated, that light emitting element 115 illuminates at least that interface 110 with sufficient luminance so that a person can see the openings of that interface 110 to engage it with, for example, a plug. The power that activates light emitting elements 115 can originate from a power source such as AC lines from a power grid, or from a backup power source such as a battery or fuel cell that may be part of power device 100.

FIG. 1A depicts interfaces 110 and light emitting elements 115 positioned on the same side of a rectangular power device 100. Other configurations are possible. For example, interfaces 110 and light emitting elements 115 can be positioned on any side or portion of power device 100. Power device 100 can also have other shapes, such as cylindrical, oval, polygonal, symmetrical or asymmetrical, and can be positioned with a longitudinal side having a larger footprint on the floor, (e.g., for stability) or extending upward from the floor and having a smaller footprint, (e.g., as in a tower, to fit in a particular area or to enhance access). In one embodiment, light emitting elements 115 are not attached to power device 100 or housing 105 and are instead located in a separate device positioned proximate to power device 100. Light emitting elements 115 can also be positioned on an extension, arm, or overhang of power device 100 to face toward and illuminate interfaces 110. The extensions or overhangs can be part of housing 105.

Figure 1B:
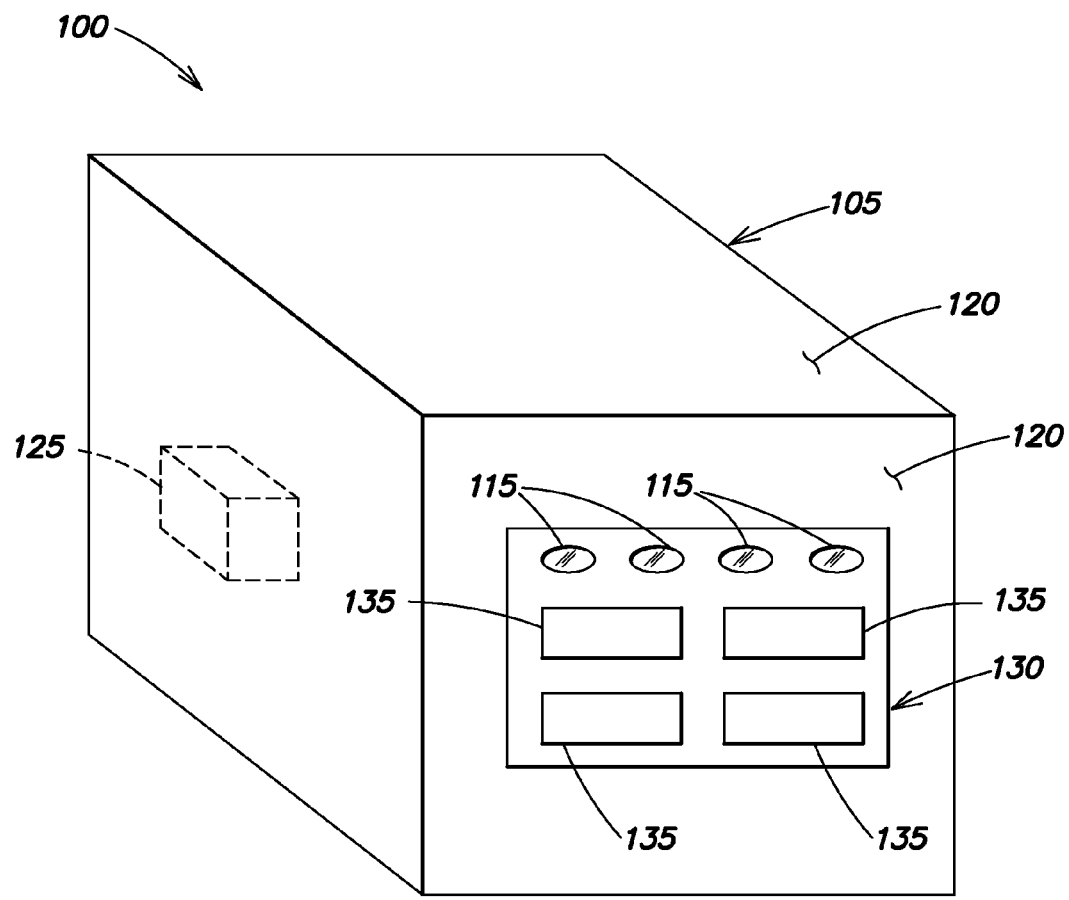
FIG. 1B is a schematic diagram depicting a power device in accordance with an embodiment.

Power device 100 includes at least one tactile sensor 120. Tactile sensor 120 can sense the presence of an object, such as a human hand, proximate to power device 100. Tactile sensor 120 may be part of or embedded into housing 105. In one embodiment, tactile sensor 120 is the conductive outer surface of at least part of housing 105, as illustrated in FIG. 1B. This may include all or substantially all conductive portions of the outer surface of housing 105. Tactile sensor 120 can also be a separate device attached to or integral with housing 105.

Tactile sensor 120 can include at least one touch sensor, such as a capacitance touch sensor. The capacitance touch sensor can detect changes in capacitance when touched by a person. For example, tactile sensor 120 can be the conductive outer surface of housing 105, which is cyclically charged and discharged with time. The capacitance of the outer surface changes when touched by a person, due to that person's natural body capacitance. The capacitance touch sensor can detect this change, (for example an increase) in capacitance. This change can be compared to a threshold value. For example, when a detected increase in capacitance is greater than a threshold value, tactile sensor 120 can determine that a person is touching housing 105 and is proximate to power device 100.

In one embodiment, tactile sensor 120 includes at least one resistance touch sensor. For example, tactile sensor 120 can include a plurality of conductive plates. When a person touches two or more of these plates a circuit is formed and the resistance between the plates changes (e.g., reduces). This change can be compared to a threshold value or previously sensed resistance value to determine that the person is touching housing 105 and is proximate to power device 100. In one embodiment, housing 105 includes a non-conductive touch pad that, when touched, activates tactile sensor 120.

In one embodiment, tactile sensor 120 senses touch, force, or pressure that indicates the presence of an object proximate to power device 100. In another one embodiment, tactile sensor 120 does not require actual contact between tactile sensor 120 and the object. For example, tactile sensor 120 can include a proximity sensor adjusted to a short range of 6 inches or less. In this example, tactile sensor 120 is considered to operate as a touch sensor in the absence of physical contact. Other ranges are possible.

Power device 100 can include at least one controller 125. Controller 125 can include one or more processors, application specific integrated circuits, or other logic devices, and can be part of an overall power device controller or a dedicated control unit. In one embodiment, controller 125 is coupled to tactile sensor 120. When an object is detected proximate to power device 100, controller 125 can activate at least one light emitting element 115 to illuminate at least a portion of housing 105 that may include at least one interface 110. Controller 125 can activate light emitting element 115 for a set time period, after which controller 125 deactivates light emitting element 115 and illumination ceases.

In one embodiment, power device 100 includes an array of tactile sensors 120. For example, detection of an object by one or more tactile sensors 120 on one side of power device 100 indicates that the object is proximate to that side of power device 100. In this example, controller 125 can activate at least one light emitting element 115 that is also located on the same side of power device 100. In another example having an array of tactile sensors 120, controller 125 can identify one or more interfaces 110 located nearest to the sensor 120 that detects the object's presence, and can activate one or more light emitting elements that are positioned to illuminate those identified interfaces 110. In another example having an array of tactile sensors 120, controller 125 can identify and activate the one or more light emitting elements 115 located nearest the sensor 120 that detects the object's presence in the absence of a determination of interface 110 location.

FIG. 1B is a schematic diagram of power device 100. In one embodiment, power device 100 includes at least one control panel 130 on one or more panels of housing 105. Control panel 130 may include at least one button 135 to control power device function. Light emitting elements 115 can be included in control panel 130, or located elsewhere on housing 105 and configured to illuminate at least part of control panel 130 when activated. Control panel 130 can also include user interfaces such as a liquid crystal display or monitor.

Figure 2:
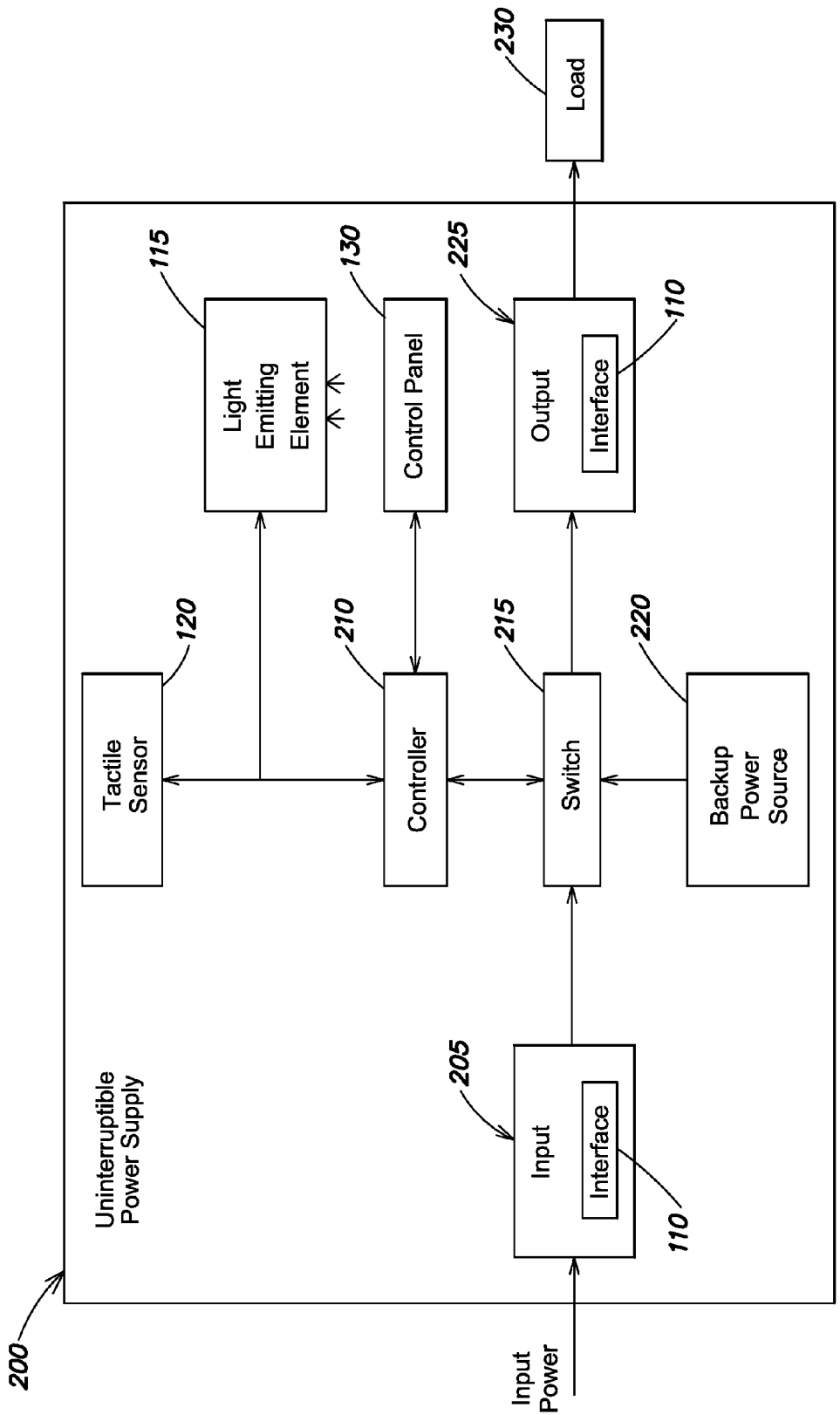
FIG. 2 is a block diagram depicting a power device in accordance with an embodiment.

In one embodiment, power device 100 is an uninterruptible power supply such as uninterruptible power supply 200 illustrated in the block diagram of FIG. 2. Input 205 includes at least one interface 110 to, for example, receive input power from a power source. Interface 110 can be part of control panel 130, and may include elements of control panel 130, such as buttons 135. Controller 210, which may be part of or separate from controller 125 of FIGS. 1A and 1B, together with switch 215 control and provide power from at least one of input 205 and backup power source 220 to output 225. For example, input 205 can receive input power from a power grid. Switch 215 connects input 205 with output 225, and controller 210 regulates the power distribution from input 205 to output 225. In one example, upon loss or interruption of power from input 205, switch 215 connects backup power source 220 with output 225 to provide generally uninterruptible power to output 225. Output 225 includes at least one interface 110 for connection with at least one load 230, such as a computer, lamp, or other electronic equipment.

Uninterruptible power supply 200 also includes at least one tactile sensor 120 and at least one light emitting element 115. Tactile sensor 120 detects a presence of an object proximate to uninterruptible power supply 200, and together with controller 210 activates at least one light emitting element 115. The activation of light emitting element 115 illuminates at least one control panel 130 or interface 110 of uninterruptible power supply 200 when, for example, an object (e.g., a person) is detected proximate to uninterruptible power supply 200.

Figure 3:
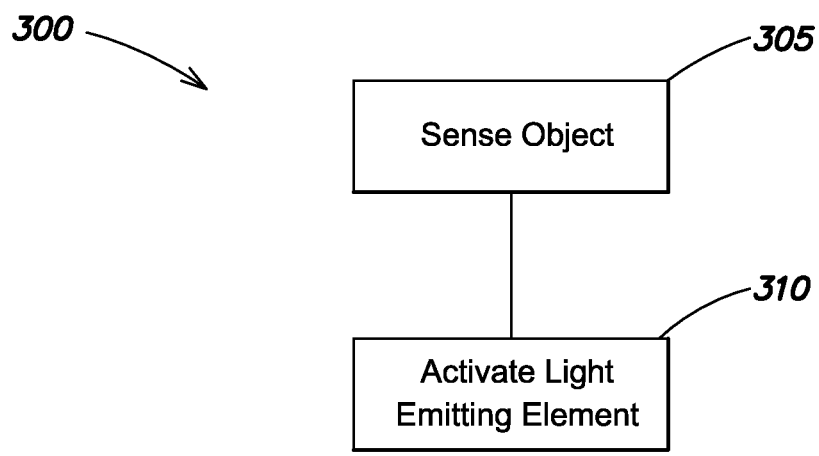
FIG. 3 is a flow chart depicting a method of illuminating a power device in accordance with an embodiment.

FIG. 3 is a flow chart depicting a method 300 of illuminating a power device. In one embodiment, method 300 includes an act of sensing an object (ACT 305). This includes, for example, sensing the presence of an object such as a person (or part of them such as their hand) proximate to a power device or its housing. Sensing the object (ACT 305) can include contact based sensing or proximity based sensing, where an object near or contacting the power device is identified as being proximate to the power device. For example, a person is proximate to the power device when their hand contacts the device housing or is within the range of a proximity sensor. This range can vary, and in one embodiment is less than 12 inches from the power device. In another embodiment, it is less than 6 inches from the power device. In one embodiment, the proximity range is less than one inch. Other ranges are possible.

Sensing the presence of the object (ACT 305) can include sensing a capacitance of the power device, sensing changes in the capacitance with time, or comparing sensed capacitance values with a threshold value. In one embodiment, sensing the presence of the object proximate to the power device (ACT 305) includes sensing a resistance value between two areas of the power device, sensing changes in resistance with time, or comparing sensed resistance values with a threshold value to detect the presence of an object.

Method 300 can also include an act of activating a light emitting element (ACT 310). In one embodiment, responsive to the sensed presence of the object (ACT 305), method 300 activates at least one light emitting element (ACT 310) to illuminate at least a portion of the power device, such as its housing. In one embodiment, activating the light emitting element (ACT 310) illuminates an interface of the power device. This illumination may be direct or indirect. The light emitting element may be activated (ACT 310) based on a comparison between a sensed capacitance value of at least a portion of the housing (e.g., outer surface of the power device) and a threshold value. For example, a sensed capacitance value can indicate the presence of an object when the capacitance value is above a threshold level, or when a difference between first and second sensed capacitance values is greater than a threshold amount.

In one embodiment, the light emitting element may be activated (ACT 310) based on a sensed resistance value between at least a two areas of the housing (e.g., outer surface of the power device). The value of the sensed resistance or its change with time can be compared with a threshold value, with the light emitting element activated (ACT 310) when the sensed resistance value is, for example, less than a threshold resistance amount due to a person's hand contacting the two areas of the housing.

In some embodiments, activating at least one light emitting element (ACT 310) illuminates at least a portion of the housing. This portion may include at least one interface, input interface, output interface, power strip, socket, universal serial bus, plug interface, outlet, connector, jack, display, or user interface. The light emitting elements may also be temporarily activated (ACT 310). For example, lighting elements can activate for a time period (e.g., 30 seconds, less than one minute, or ten minutes) that begins when the presence of the object is sensed (ACT 305). This gives the person proximate to the power device time to engage components and devices (e.g., cables or loads) with the power device interfaces, while at least a portion of the power device is illuminated. The time period can be extended when the person remains proximate to the power device upon the time periods originally scheduled expiration. The illuminated area can include, for example, the interfaces being engaged by the person, or the area of the power device nearest the point of engagement.

Having now described some illustrative embodiments, it is apparent that the foregoing is illustrative and not limiting, having been presented by way of example. In particular, although many of the examples presented herein involve specific combinations of method acts or system elements, it is understood that those acts and those elements may be combined in other ways to accomplish the same objectives. Acts, elements and features discussed only in connection with one embodiment are not intended to be excluded from a similar role in other embodiments.

Note that in FIGS. 1 through 3, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. In one embodiment, the program storage medium is non-transitory. The program storage medium includes data signals embodied in one or more of a carrier wave, a computer disk (magnetic, or optical (e.g., CD or DVD, or both)), non-volatile memory, tape, a system memory, and a computer hard drive.

From the foregoing, it is appreciated that the power devices provided by the systems and methods described herein afford an elegant and effective way to selectively illuminate the portions of power devices, such as particular interfaces, that are proximate to a person who is accessing the power device for installation, operation, maintenance, or other purposes. Power device illumination can occur based on the presence of the person within several inches of the power device, and in the absence of the need for the person to operate a mechanical switch for illumination, that may be difficult to see or access in darker or cramped locations, and can with time introduce dirt or foreign substances around its edges and into the power device, which can shorten the life of the power device.

Any references to front and back, left and right, top and bottom, sides, or upper and lower and the like are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects and embodiments disclosed herein.

References to "or" may be construed as inclusive so that any terms described using "or" may indicate any of a single, more than one, and all of the described terms. Intervening embodiments, acts, or elements are not essential unless recited as such. Any solution to a problem, or any element or act presented herein in the alternative, for example using the word "or," is neither ambiguous nor indirect simply because it may be presented in the alternative. Any such alternative embodiments, solutions, elements, or acts are derivable directly and unambiguously as at least one embodiment independent of any other alternative solutions, elements, or acts.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the characteristics thereof. For example, the controller can activate the light emitting element that illuminates the interface closest to the sensed presence of the object. In addition to being a person, the object can be an animal or inanimate object. Capacitance, resistance, or pressure changes detected at any part of the housing can be sensed, and in one embodiment the entire housing acts as the tactile sensor. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An uninterruptible power supply, comprising:
an input configured to receive input power;
a backup power source configured to provide backup power;
a housing including an interface, a plurality of light emitting elements, and an array of tactile sensors, the array of tactile sensors configured to detect a presence of an object proximate to the uninterruptible power supply, a first tactile sensor of the array configured to activate a first light emitting element, a second tactile sensor of the array configured to activate a second light emitting element; and
a controller configured to provide output power derived from at least one of the input power and the backup power at an output, and to activate the plurality of light emitting elements to illuminate the interface.

2. The uninterruptible power supply of claim 1, wherein the array of tactile sensors is configured to detect a capacitance value, and wherein the controller is configured to activate the light emitting element based on the capacitance value.

3. The uninterruptible power supply of claim 1, wherein the array of tactile sensors is configured to detect a resistance value, and wherein the controller is configured to activate the light emitting element based on the resistance value.

4. The uninterruptible power supply of claim 1, wherein the array of tactile sensors is configured to detect the presence of the object based on contact by the object with the uninterruptible power supply.

5. The uninterruptible power supply of claim 1, wherein the plurality of light emitting elements is configured to illuminate at least one of a power strip, a socket, a universal serial bus, a plug interface, an outlet, a connector, a jack, a display, a control panel, and a user interface.

6. The uninterruptible power supply of claim 1, further comprising a plurality of interfaces, wherein the plurality of light emitting elements is configured to illuminate at least one of the plurality of interfaces.

7. The uninterruptible power supply of claim 1, wherein a conductive surface of the uninterruptible power supply includes the array of tactile sensors.

8. The uninterruptible power supply of claim 1, wherein the array of tactile sensors includes at least one of a touch sensor, a capacitance touch sensor, a resistance touch sensor, and a proximity sensor.

9. The uninterruptible power supply of claim 1, wherein the array of tactile sensors includes a proximity sensor configured to detect the presence of the object within six inches of the uninterruptible power supply.

10. The uninterruptible power supply of claim 1, wherein the output includes an output interface configured to connect with at least one load.

11. A method of illuminating a housing of an uninterruptible power supply, the uninterruptible power supply having an input configured to receive input power, a backup power source configured to provide backup power, a controller, and the housing, the housing including at least one interface, the method comprising:
providing output power derived from at least one of the input power and the backup power at a first interface of the housing;
sensing a presence of an object proximate to the housing with an array of tactile sensors;
activating, by the controller, responsive to sensing the presence of the object with a first tactile sensor of the array, a first light emitting element to illuminate a second interface of the housing; and
activating, by the controller, responsive to sensing the presence of the object with a second tactile sensor of the array, a second light emitting element to illuminate a third interface of the housing.

12. The method of claim 11, comprising:
determining a capacitance value of the housing of the uninterruptible power supply; and
activating one of the first light emitting element and the second light emitting element based on an evaluation of the capacitance value and a threshold capacitance value.

13. The method of claim 11, comprising:
determining a first capacitance value of the housing of the uninterruptible power supply at a first time;
determining a second capacitance value of the housing at a second time; and
activating one of the first light emitting element and the second light emitting element when a difference between the first capacitance value and the second capacitance value is greater than a threshold amount.

14. The method of claim 11, comprising:
identifying a change in capacitance of the housing of the uninterruptible power supply; and
activating one of the first light emitting element and the second light emitting element based on a magnitude of the change.

15. The method of claim 11, comprising:
sensing the presence of the object based on a capacitance value of the housing of the uninterruptible power supply and a threshold capacitance value.

16. The method of claim 11, comprising:
determining a resistance value of the housing of the uninterruptible power supply; and
activating one of the first light emitting element and the second light emitting element based on an evaluation of the resistance value and a threshold resistance value.

17. The method of claim 11, comprising:
illuminating a portion of the uninterruptible power supply that includes at least one of a power strip, a socket, a universal serial bus, a plug interface, an outlet, a connector, a jack, a display, a control panel, and a user interface.

18. An uninterruptible power supply comprising:
an input configured to receive input power;
a backup power source configured to provide backup power;
a housing including an interface;
control circuitry configured to provide output power derived from at least one of the input power and the backup power at an output; and
an array of tactile sensors and a plurality of light emitting elements, a first tactile sensor of the array and the control circuitry configured to activate a first light emitting element, a second tactile sensor of the array and the control circuitry configured to activate a second light emitting element.

19. The uninterruptible power supply of claim 18, wherein the array of tactile sensors is configured to detect at least one of a capacitance value of the housing, a resistance value of the housing, and a proximity distance between the object and the uninterruptible power supply.

* * * * *